United States Patent [19]

Hutton et al.

[11] E Re. 30,423

[45] Reissued Oct. 28, 1980

[54] VARIABLE SPEED WINCH

[75] Inventors: Albert J. Hutton, Baulkham Hills; Allen W. Hutton, Burwood; Richard J. Dellit, Granville, all of Australia

[73] Assignee: Barlow Marine Limited, Australia

[21] Appl. No.: 915,008

[22] Filed: Jun. 13, 1978

Related U.S. Patent Documents

Reissue of:

[64] Patent No.: 3,962,935
Issued: Jun. 15, 1976
Appl. No.: 522,123
Filed: Nov. 8, 1974

[30] Foreign Application Priority Data

Nov. 12, 1973 [AU] Australia ..... 5622/73

[51] Int. Cl.[2] ..... F16H 5/52; B66D 1/30

[52] U.S. Cl. ..... 254/346; 74/812; 254/344; 254/354

[58] Field of Search ..... 74/810, 812; 254/150 R

[56] References Cited

U.S. PATENT DOCUMENTS

| | | | |
|---|---|---|---|
| 2,536,299 | 10/1970 | McCloud | 254/150 R |
| 3,288,439 | 11/1966 | Holmes | 254/150 R |
| 3,599,937 | 8/1971 | Carter | 254/150 R |
| 3,618,896 | 11/1971 | Bewley | 254/150 R |
| 3,656,596 | 4/1972 | Morgan | 254/150 R |
| 3,670,589 | 6/1972 | Carter | 254/150 R |
| 3,728,914 | 4/1973 | Guangorena et al. | 74/812 |
| 3,799,005 | 3/1974 | Koehler | 74/812 |
| 3,802,665 | 4/1974 | Fawcett | 74/812 |
| 3,809,368 | 5/1974 | Lawrence | 74/812 X |

*Primary Examiner*—Leslie Braun

*Attorney, Agent, or Firm*—Karl W. Flocks

[57] ABSTRACT

A variable speed winch including a uni-directional drum rotatable initially by the clockwise motion of a handle in a clockwise sense only. The winch also includes a gear selector including a control plate rotatable with respect to the drum into an extreme clockwise position wherein a first gear ratio is selected. The gear selector further includes ratchet structure, splined to a shaft rotatable by the handle. The ratchet structure is slidable axially with respect to the shaft under the influence of a cam structure responsive to the relative angular displacements of the handle with respect to the control plate. The control plate has recesses engageable by respective spring-loaded balls captively supported by the ratchet structure. The balls are adapted to enter and lock within the recesses in response to an anti-clockwise rotation of the handle sufficient to cause axial sliding of the ratchet structure, with respect to the shaft, under the influence of the cam structure. Subsequent clockwise rotation of the handle gives the drum a clockwise speed equal to that of the handle, and subsequent anti-clockwise rotation of the handle causes the drum to continue clockwise rotation at an intermediate higher speed with reference to the handle, up to a point where the control plate is urged into an extreme anti-clockwise position with respect to the drum to select a second gear ratio, whereupon the reversal of the handle and subsequent clockwise rotation thereof causes continued clockwise rotation of the drum at a still higher speed with reference to the handle, and reversal of the handle and subsequent further anti-clockwise rotation thereof causes the drum to revert to the intermediate higher speed while continuing to rotate clockwise.

4 Claims, 6 Drawing Figures

FIG.5
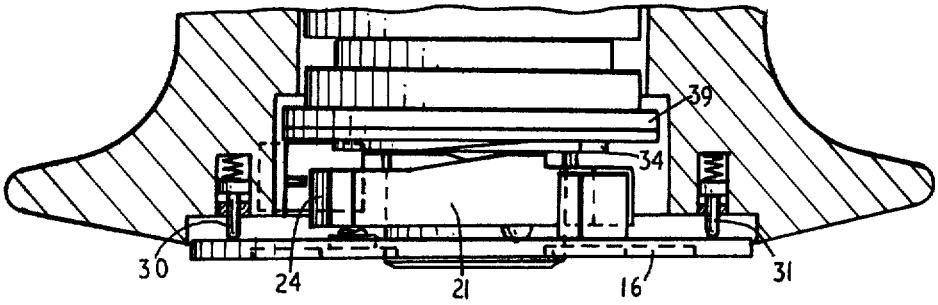
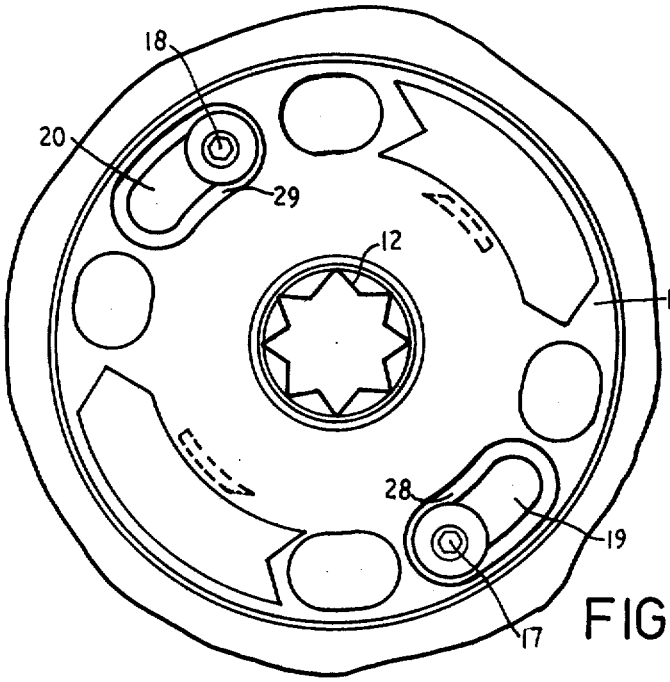
FIG.6

VARIABLE SPEED WINCH

Matter enclosed in heavy brackets [ ] appears in the original patent but forms no part of this reissue specification; matter printed in italics indicates the additions made by reissue.

This invention relates to winches, and more particularly to variable speed winches of the kind used to manipulate the sheets of sails or the like.

It is known to construct marine winches having variable rotation speeds, and in which a reduction gear is located so that a handle turned in a clockwise sense gives a high speed to a drum in an anti-clockwise sense, whereas an oppposite handle rotation gives said drum a low speed in a clockwise sense. It is an object of the present invention, however, to provide a winch in which a plurality of speeds may be selected for a drum, the rotation of which is unidirectional, but in which said handle may rotate in either sense. It is a further object to provide a drum which is freely manually rotatable by an operator who meanwhile maintains said handle stationary.

According to the invention therefore, in one of its aspects, a winch comprises, in combination, a unidirectional drum rotatable initially by the clockwise motion of a handle in a clockwise sense only, and a gear selector comprising a control plate rotatable with respect to said drum into an extreme clockwise position wherein a first gear ratio is selected, whereby subsequent clockwise rotation of said handle gives the drum a clockwise speed equal to that of the handle, and wherein subsequent anti-clockwise rotation of said handle causes said drum to continue clockwise rotation at an intermediate higher speed with reference to the handle, up to a point where said control plate is urged into an extreme anti-clockwise position with respect to said drum to select a second gear ratio, whereupon the reversal of the handle and subsequent clockwise rotation thereof causes continued clockwise rotation of said drum at a still higher speed with reference to said handle, and wherein reversal of said handle and subsequent further anti-clockwise rotation thereof causes said drum to revert to said intermediate higher speed whilst continuing to rotate clockwise.

Figure 1:
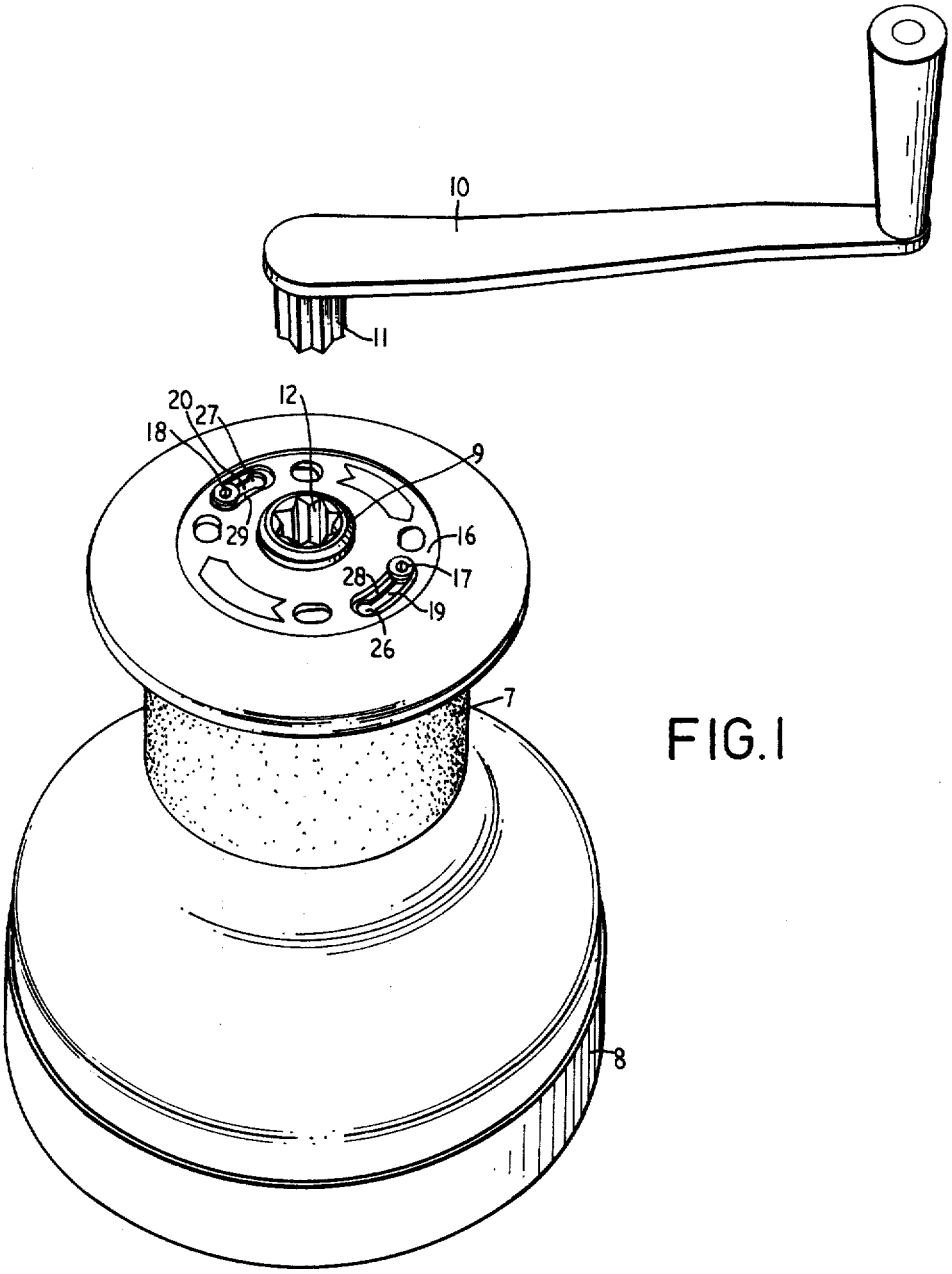
Figure 2:
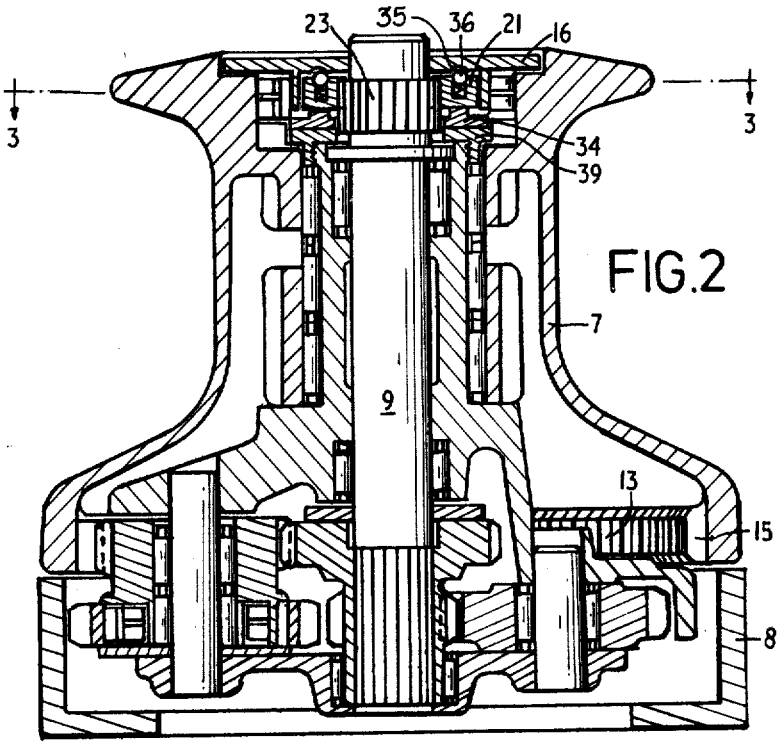
Figure 3:
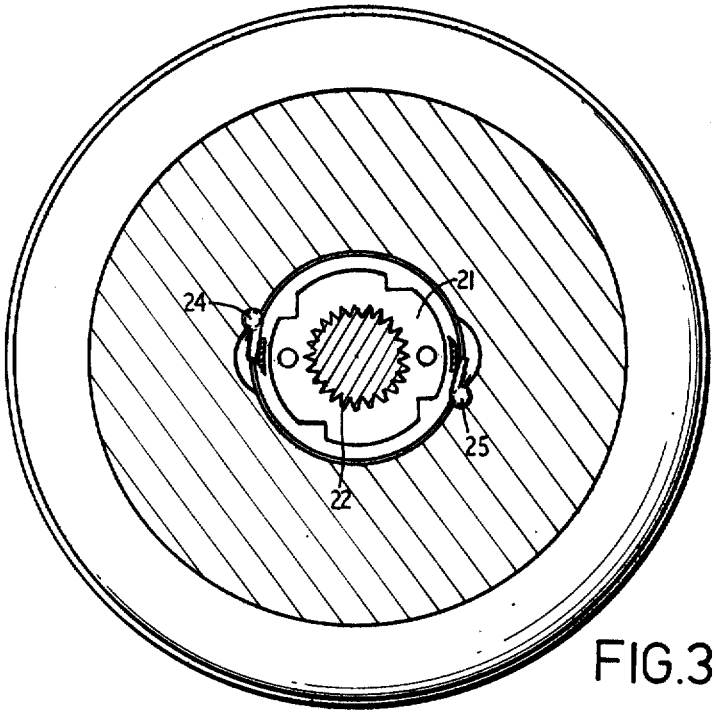
Figure 4:
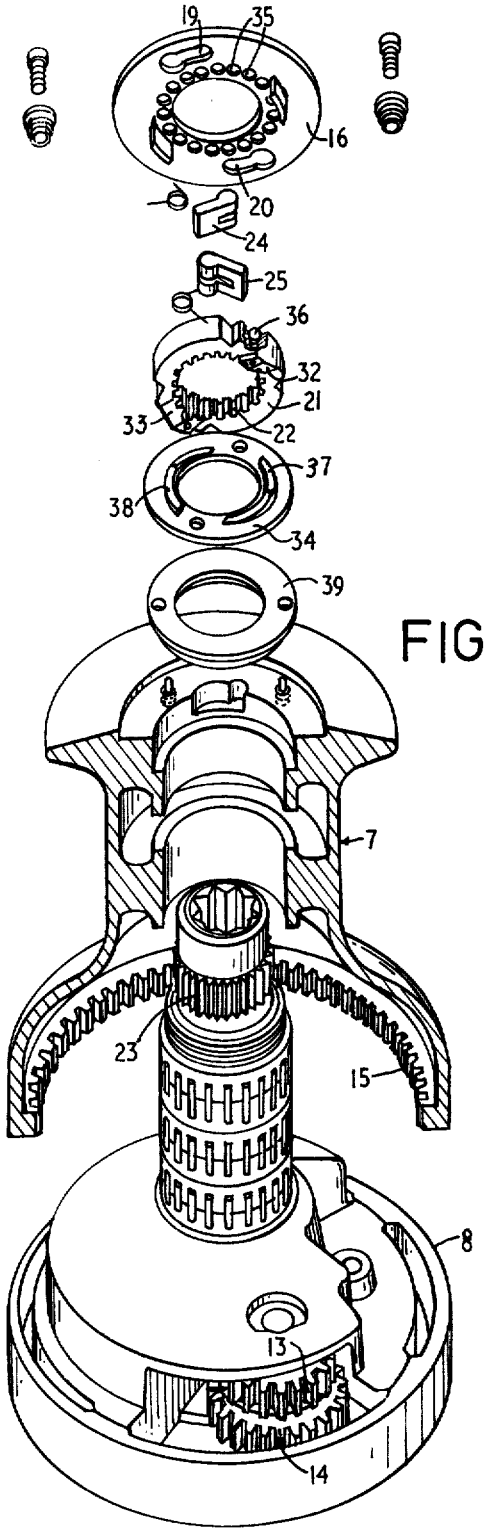

One embodiment of the invention defined in the preceding paragraph will now be described herein with reference to the accompanying drawings, in which similar references indicate corresponding parts, and in which FIG. 1 shows, in perspective, a view of an assembled winch with its operating handle detached, FIG. 2 shows said winch in elevation and partly in section, FIG. 3 shows, in plan and partly in section, a view along the line 3—3 of FIG. 2, FIG. 4 shows, in perspective, an exploded view of the speed-changing mechanism of said winch, FIG. 5 shows, in elevation and partly in section, a detailed view of the location of a control plate for said winch, and FIG. 6 shows said control plate in plan view from above.

Upon referring to the drawings it will be seen that a drum 7 is mounted for rotation with respect to a base support 8 about a shaft 9 by means of the handle 10 when said handle removably engages said shaft by means of the co-acting splines 11 and 12. Rotary motion of the shaft 9 is transmitted to the drum 7 via a reduction gear train which includes the pinions 13 and 14 and the ring gear 15 in a manner hereinafter described.

When said "first" gear is engaged by the clockwise movement of the control plate 16, said plate takes up the position shown in FIG. 1 with the studs 17 and 18 hard up against the ends of their respective slots 19 and 20. The drum 7 may then be rotated in a clockwise sense by hand whilst the handle 10 is held stationary, thus permitting an operator to bring in the slack on a sheet without disengaging first gear. This action is desirable, for example, when a considerable length of sheet connects a sail with the drum. When the slack is taken up, the operator may then commence to turn the handle 10 normally in a clockwise sense, thus achieving the highest available drum speed but with the minimum mechanical advantage. As the load on the sheet increases, the operator reverses the handle direction until the highest available speed ratio of handle and drum provides the lowest drum speed but the greatest mechanical advantage. If at any time an intermediate condition is required the operator may quickly move the handle clockwise to take advantage of the intermediate speed ratio available.

To achieve the above-described results, the control plate 16 effects a change from "first" to "second" gear owing to the action of a ratchet ring 21 which is held against rotation with respect to the shaft 9 by the coacting splines 22 and 23, thus connecting the handle 10 to said reduction gear train. When in first gear with the control plate 16 turned fully clockwise, the clockwise rotation of the handle 10 and hence of the ring 21 causes engagement between the ring and one or more pawls such as 24 and 25 located hingedly with respect to the drum. However, anti-clockwise rotation of said handle causes said ring to move freely past said pawls. The control plate, which is attached to an end cheek of the drum via the studs 17 and 18, is so shaped that the pair of arcuate slots 19 and 20 have respective depressions 26 and 27 which accept and hold said studs in the anti-clockwise or second gear position shown in FIG. 6. Said slots however cause each said stud or a shoulder thereon to ride up upon the respective shelves 28 and 29 within said slots 19 and 20 when said plate is rotated into the extreme clockwise position. In both said positions the control plate is urged outwardly away from the end cheek under the influence of axially directed spring-loaded pins 30 and 31. Thus during said anti-clockwise movement of the handle the ratchet ring 21, upon the lower surface of which a pair of cams 32 and 33 is formed, rides axially outwardly under the influence of a lower cam plate 34 when moving from the second gear position to the first gear position. As each stud 17 and 18 moves up upon its respective associated shelf 28 and 29 the control plate 16 is depressed against the pins 30 and 31 and so puts a series of recesses such as 35 located on the reverse side of said control plate into a position wherein its engagement by a set of upwardly directed ball-bearings such as 36 mounted captively upon the top of the ratchet ring 21 is possible. This possibility is not significant when the handle 10 is moved clockwise, but when it is moved anti-clockwise the top cams 32 and 33 upon the ratchet ring 21 ride up over the co-acting lower cams 37 and 38 upon the lower cam plate 34 at certain angular positions of said handle at which said ball-bearings engage the control plate via said recesses, and hence causes said control plate to move anti-clockwise to a position where the ball-bearings can no longer engage said recesses.

Throughout said cam action the spline 23 on the shaft 9 allows the ratchet ring 21 to ride to and fro in an axial direction. It will be seen that the pins 30 and 31 urge the control plate 16 away from the drum 7 when the second gear position is assumed and hence it is necessary to push the control plate manually or otherwise towards the drum before twisting it into the first gear position.

A retaining ring or nut 39 is mounted below the lower cam plate 34 to align the shaft 9 and the relatively moving components thereon with respect to the base support 8 of the winch.

In one embodiment of the invention said reduction gear train is so designed that said intermediate higher speed ratio of drum to handle is 3:1, and said still higher speed ratio is 6:1.

If the above-described cam action had been bi-directional as in some prior systems, it would be possible to rotate the drum 7, during tailing, so energetically that the control plate 16 would flick out of first gear into the second gear position. Tailing is desirable when an operator is manipulating a large sail such as a spinnaker, which must be allowed to extend an attached sheet if necessary, said sheet then being reeled in again at the first opportunity by means of the winch, which preferably should not be allowed to disengage its first gear unless the operator so decides.

To permit tailing without risk of such an unwanted gear change said cam action has therefore been made uni-directional. It is for this reason that upon the lower surface of the ratchet ring 21 and upon the upper surface of the lower cam plate 34 a respective pair of cams 32, 33 and 37, 38 in the shape of tapered ramps is formed, each having a squared-off shoulder remote from its faired-in end as best shown in FIG. 4. These ramps cause the ratchet ring 21 to move out axially at pre-set angular relative displacements of the ratchet ring 21 with respect to the lower cam plate 34. However, when the control plate 16 is in the fully clockwise or first gear position, the clockwise turning of the handle 10 causes a coacting pair of said squared-off shoulders on the ratchet ring to engage the similar shoulders on the lower cam plate. The ratchet ring, which turns with the shaft 9 because it is splined thereto, thus causes the lower cam plate also to turn with the shaft. Hence there is no axial movement of the ratchet ring outwardly to cause engagement of the control plate by the ball-bearing 35 even when the drum 7 is then turned so as to free-wheel rapidly in a clockwise sense without moving the handle 10.

It will be appreciated that apparatus may be constructed in accordance with the invention using other speed ratios, and that the ratios above described are given by way of example only. Furthermore, the references herein to clockwise and anti-clockwise rotation may be interchanged, mutatis mutandis.

The claims defining the invention are as follows:

1. A winch comprising, in combination, a unidirectional drum rotatable *in one sense of rotation only* initially by the [clockwise motion] *rotation* of a handle in a [clockwise] *first* sense [only], and a gear selector comprising a control [plate] *member* rotatable with respect to said drum into [an extreme clockwise] *a first* position wherein a first gear ratio is selected[, whereby subsequent clockwise] *in which* rotation of said handle *in said first sense* gives the drum a [clockwise] *rotational* speed equal to that of the handle, and wherein subsequent [anti-clockwise] rotation of said handle *in a second sense opposite to said first sense* causes said drum to continue [clockwise] rotation [at] *in said one sense via* an intermediate [higher speed with reference to the handle, up to a point where said] *gear ratio selected by this reversal of the sense of rotation of the handle to obtain rotation of the handle in said second sense, said rotation of the handle in the second sense enabling said* control [plate is] *member to be* urged into [an extreme anti-clockwise] *a second* position with respect to said drum to select a second gear ratio *for rotation of said handle in the first sense,* whereupon *after selection of said second gear ratio* the reversal of the handle [and] *with* subsequent [clockwise] rotation thereof *in said first sense* causes continued [clockwise] rotation of said drum [at a still higher speed with reference to said handle] *in said one sense via said second gear ratio* and wherein *a subsequent* reversal of said handle [and subsequent] *with* further [anti-clockwise] rotation [thereof] *in said second sense* causes said drum to revert to *rotation via* said intermediate [higher speed] *gear ratio* whilst continuing to rotate [clockwise] *in said one sense,* said gear selector further comprises ratchet means [splined to a shaft rotatable by said handle,] whereby [clockwise motion] *rotation* of said handle [operates a gear train] *in said first sense directly drives said drum* in said first gear ratio, via said shaft but whereby [anti-clockwise motion] *rotation* of said handle [operates said gear train] *in said second sense drives said drum* in said [second] *intermediate* gear ratio via [said shaft] *a gear train;* said ratchet means being slidable [axially] with respect to said shaft under the influence of cam means responsive to [the relative angular displacement] *rotation* of said handle [with respect to said control plate] *in said second sense,* said control [plate] *member* has [recesses] *first entrainment means* engageable by [respective spring loaded balls captively] *second entrainment means* supported by [said] ratchet means, [and said balls are] *one of said first and second entrainment means is* adapted to [enter and lock within said recesses] *entrain the other of said first and second entrainment means* in response to [an anti-clockwise] rotation of said handle *in said second sense* sufficient to cause [axial] sliding of said ratchet means[,] with respect to said shaft[,] under the influence of said cam means whereby said control [plate] *member* is urged [anti-clockwise until] *towards said second position in which* said gear train assumes said second gear ratio.

2. A winch as claimed in claim 1, wherein said control plate is normally continuously urged axially outwards [away from said drum by spring-loading means] *relative to said shaft.*

3. A winch as claimed in claim 2, wherein said control [plate] *member* is adapted for [manual clockwise] rotation towards said [second] *first* gear position after initial inward axial displacement of said control [plate] *member* with respect to a plurality of reference studs fixed with respect to support means [for] *on* said drum, said studs [being thereby adapted to emerge] *by this displacement moving* from a rest position within respective co-acting arcuate slots perforating said control [plate into] *member to* a position wherein said studs ride up upon and slide with respect to shoulders extending throughout at least part of each said slot.

4. A winch as claimed in [any one of] claim 1, wherein said cam means comprises one or more unidirectional tapered ramps disposed upon a disc mounted co-axially with respect to said shaft, one end of each said ramp being faired in to said disc, and the other end of each said ramp comprising a squared-off shoulder directed axially away from said disc, and each said ramp being adapted to engage a co-acting ramp disposed upon said ratchet means on a surface of said ratchet means remote from said control [plate] *member*, whereby axial movement of said ratchet means outwardly to cause engagement of said control [plate] *member* is prevented during free-wheeling of said [drum] *ratchet means* with respect to said shaft [via said ratchet means] after said control [plate] *member* has been turned [fully clockwise into] *to said first position to select* said first gear [position] by [clockwise turning] *rotation* of said handle *in said first sense.*

* * * * *